(12) United States Patent
Pongratz et al.

(10) Patent No.: US 12,321,000 B2
(45) Date of Patent: Jun. 3, 2025

(54) FILM STACKS FOR THIN CIRCULAR POLARIZERS

(71) Applicant: 3M INNOVATIVE PROPERTIES COMPANY, St. Paul, MN (US)

(72) Inventors: Alex P. Pongratz, Minneapolis, MN (US); David T. Yust, Woodbury, MN (US); Michael A. Johnson, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 161 days.

(21) Appl. No.: 17/757,755

(22) PCT Filed: Dec. 22, 2020

(86) PCT No.: PCT/IB2020/062336
§ 371 (c)(1),
(2) Date: Jun. 20, 2022

(87) PCT Pub. No.: WO2021/130672
PCT Pub. Date: Jul. 1, 2021

(65) Prior Publication Data
US 2023/0034724 A1    Feb. 2, 2023

Related U.S. Application Data

(60) Provisional application No. 62/953,642, filed on Dec. 26, 2019.

(51) Int. Cl.
*G02B 5/30*    (2006.01)
*B32B 27/36*   (2006.01)
(Continued)

(52) U.S. Cl.
CPC .............. *G02B 5/305* (2013.01); *B32B 27/36* (2013.01); *B32B 27/40* (2013.01); *G02B 1/04* (2013.01);
(Continued)

(58) Field of Classification Search
CPC ...... G02B 1/04; G02B 5/3033; G02B 5/3041; G02B 5/305
See application file for complete search history.

(56) References Cited

U.S. PATENT DOCUMENTS 6,096,375 A    8/2000 Ouderkirk et al.
6,111,697 A    8/2000 Merrill et al.
(Continued)

FOREIGN PATENT DOCUMENTS

CN    108367553 A    8/2018
JP    2000338329 A   12/2000
(Continued)

OTHER PUBLICATIONS

"Strain Hardening", 2024, Science Direct, https://www.sciencedirect.com/topics/physics-and-astronomy/strain-hardening (Year: 2024).*
(Continued)

*Primary Examiner* — Jasper Saberi
(74) *Attorney, Agent, or Firm* — Clifton F. Richardson; Erik M. Drange

(57) ABSTRACT

Film stacks comprise a quarter-wave retarder and a transparent aliphatic cross-linked polyurethane layer disposed on a major surface of the quarter-wave retarder. The transparent aliphatic cross-linked polyurethane layer has a glass transition temperature in a range from 11 to 27° C. and a Tan Delta peak value in a range from 0.5 to 2.5.

16 Claims, 2 Drawing Sheets

(51) Int. Cl.
  *B32B 27/40* (2006.01)
  *G02B 1/04* (2006.01)
  *G02B 1/08* (2006.01)

(52) U.S. Cl.
  CPC ............ *G02B 1/08* (2013.01); *G02B 5/3033* (2013.01); *G02B 5/3041* (2013.01); *G02B 5/3083* (2013.01); *B32B 2307/40* (2013.01); *B32B 2551/00* (2013.01)

(56) References Cited

U.S. PATENT DOCUMENTS

| | | | |
|---|---|---|---|
| 9,618,668 | B2 | 4/2017 | Kitagawa |
| 2002/0180916 | A1 | 12/2002 | Schadt et al. |
| 2003/0028048 | A1 | 2/2003 | Cherkaoui et al. |
| 2005/0072959 | A1 | 4/2005 | Moia et al. |
| 2012/0037928 | A1* | 2/2012 | Shim ................ H10K 59/8793 257/E33.068 |
| 2014/0295174 | A1 | 10/2014 | Eveson et al. |
| 2017/0031074 | A1 | 2/2017 | Kong |
| 2017/0165950 | A1* | 6/2017 | Leatherdale ......... H10K 77/111 |
| 2017/0170416 | A1* | 6/2017 | Johnson .................... B32B 7/06 |
| 2017/0254939 | A1 | 9/2017 | Lee |
| 2017/0299779 | A1* | 10/2017 | Mita ......................... B32B 7/12 |
| 2017/0308193 | A1 | 10/2017 | Wu |
| 2018/0143363 | A1 | 5/2018 | Ichihashi et al. |
| 2018/0264790 | A1 | 9/2018 | Leatherdale et al. |
| 2018/0298153 | A1 | 10/2018 | Shih et al. |
| 2022/0236467 | A1* | 7/2022 | Nishio ............... H10K 59/8793 |

FOREIGN PATENT DOCUMENTS

| | | |
|---|---|---|
| JP | 2004144943 A | 5/2004 |
| JP | 2019173001 A | 10/2019 |
| WO | 2016035636 A1 | 3/2016 |
| WO | 2016158300 A1 | 10/2016 |
| WO | WO-2017105850 A1 * 6/2017 | ............. B32B 27/08 |
| WO | WO-2017214105 A2 * 12/2017 | ............. B32B 27/08 |
| WO | WO-2018005833 A2 * 1/2018 | ............. B32B 25/08 |
| WO | WO-2018057774 A1 * 3/2018 | ............. B32B 17/06 |
| WO | 2019003107 A1 | 1/2019 |
| WO | 2019032635 A1 | 2/2019 |
| WO | 2019092571 A1 | 5/2019 |
| WO | WO-2020241312 A1 * 12/2020 | ............. B32B 27/36 |

OTHER PUBLICATIONS

International Search Report for PCT Application No. PCT/IB/062336 mailed on May 6, 2021, 3 pages.

* cited by examiner

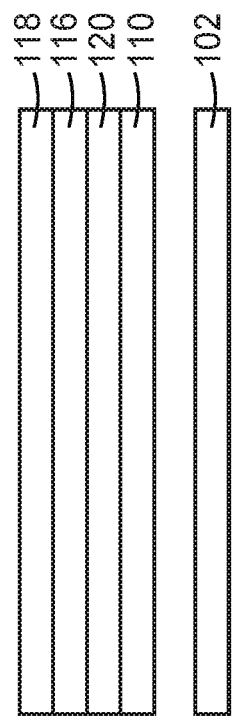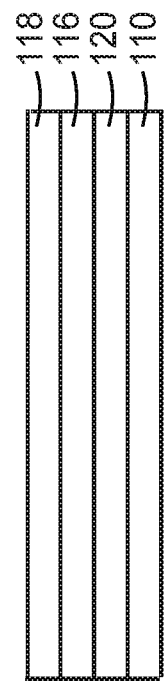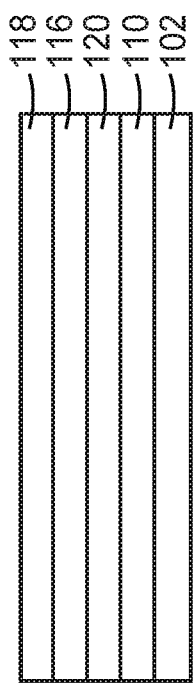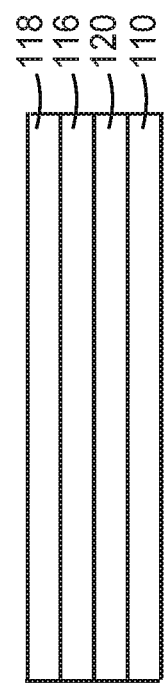
FIG. 2E
FIG. 2F

FILM STACKS FOR THIN CIRCULAR POLARIZERS

CROSS REFERENCE TO RELATED APPLICATIONS

This application is a national stage filing under 35 U.S.C. 371 of PCT/IB2020/062336, filed Dec. 22, 2020, which claims the benefit of U.S. Provisional Patent Application No. 62/953,642, filed Dec. 26, 2019, the disclosure of which is incorporated by reference in its/their entirety herein.

FIELD

This invention relates to film stacks useful for circular polarizers and to methods of making the film stacks.

BACKGROUND

Emissive displays such as organic light emitting diode (OLED) displays often utilize circular polarizers as antireflection films. Typically, circular polarizers comprise film components laminated together and are relatively thick. With the development of new form factors such as bendable and rollable emissive displays, there is a need for thinner display components. The traditional thick film stack circular polarizers cannot survive the tight bend radii needed for bendable and rollable displays. Past attempts to make thin (e.g., less than 50 μm thick) circular polarizers has resulted in films that have problems with mechanical integrity and that crack or break during bending and folding.

SUMMARY

In view of the foregoing, we recognize that there is a need for thin yet mechanically robust circular polarizers.

In one aspect, the present invention provides a film stack comprising a quarter-wave retarder, and a transparent aliphatic cross-linked polyurethane layer disposed on a major surface of the quarter-wave retarder. The transparent aliphatic cross-linked polyurethane layer has a glass transition temperature in a range from 11 to 27° C. and a Tan Delta peak value in a range from 0.5 to 2.5.

In another aspect, the present invention provides a film stack comprising a film comprising a layer of strain hardening polyester, an oriented layer comprising polyvinyl alcohol disposed on the layer of strain hardening polyester, and a transparent aliphatic cross-linked polyurethane layer having a thickness of 100 μm or less disposed on the oriented layer comprising polyvinyl alcohol opposite the layer of strain hardening polyester. The transparent aliphatic cross-linked polyurethane has a glass transition temperature in a range from 11 to 27° C. and a Tan Delta peak value in a range from 0.5 to 2.5.

The film stacks of the invention enable circular polarizers having a total thickness less than 35 μm, 25 μm, 20 μm, 15 μm, 10 μm, 5 μm or 3 μm that are mechanically robust and thus useful for highly curved, foldable or rollable displays.

In still another aspect, the present invention provides a method of making a film stack comprising (a) coating a layer comprising polyvinyl alcohol on a film comprising a layer of strain hardening polyester, (b) orienting the coated film in a first direction, and (c) coating the layer comprising polyvinyl alcohol with a transparent aliphatic cross-linked polyurethane layer having a thickness of 100 μm or less. The transparent aliphatic cross-linked polyurethane layer has a glass transition temperature in a range from 11 to 27° C. and a Tan Delta peak value in a range from 0.5 to 2.5.

BRIEF DESCRIPTION OF THE DRAWINGS

FIGS. 2A-2F are cross-sectional views of a film stack being made according to a process.

DETAILED DESCRIPTION

Figure 1:
FIG. 1 is a cross-sectional view of a film stack.

The present invention enables a very thin circular polarizer comprising a stained polyvinyl alcohol (PVOH) layer, a polyurethane primer and a quarter-wave retarder. In some embodiments, the PVOH layer is less than 10 μm thick, primer is less than 20 μm thick, the quarter-wave retarder is less than 5 μm and the total thickness of the thin circular polarizer is less than 35 μm, 25 μm, 20 μm, 15 μm, 10 μm, 5 μm or 3 μm.

The film stacks of the invention include a urethane primer layer that bonds a polyvinyl alcohol layer and quarter-wave retarder. Surprisingly, the urethane primer layer enables very thin constructions that resist cracking of the polyvinyl alcohol layer. The urethane primer material also resists staining during the polyvinyl alcohol staining process. In addition, the urethane primer layer allows for use of the aggressive solvents of many liquid crystal polymers without increasing haze.

In some embodiments, the urethane primer layer has a thickness less than 100 μm, 50 μm, 30 μm, 20 μm, 10 μm or 5 μm. In some embodiments, the urethane primer has a thickness of 4 μm to 10 μm.

The urethane primer layer comprises a transparent aliphatic cross-linked polyurethane such as those described in US 2017/0165950. "Polyurethane" refers to polymers prepared by the step-growth polymerization of hydroxyl-functional materials (materials containing hydroxyl groups —OH) with isocyanate-functional materials (materials containing isocyanate groups —NCO) and therefore contain urethane linkages (—O(CO)—NH), where (CO) refers to a carbonyl group (C=O). The term may include "polyurethane-ureas" in which both urethane linkages and urea linkages are present.

The transparent aliphatic cross-linked polyurethane layer may have a glass transition temperature in a range from 11 to 27 degrees Celsius or from 17 to 22 degrees Celsius. The phrase "glass transition temperature" refers herein to the on-set glass transition temperature by DSC and is measured according to ASTM E1256-08 2014.

The transparent aliphatic cross-linked polyurethane layer may have a Tan Delta peak value in a range from 0.5 to 2.5, or from 1 to 2, or from 1.4 to 1.8. Tan Delta peak value and peak temperature is measured according to the DMA analysis described in the Examples. The transparent aliphatic cross-linked polyurethane layer may have a cross-link density in a range from 0.34 to 0.65 mol/kg.

The transparent aliphatic cross-linked polyurethane layer may be coated and then be cured or cross-linked to form a thermoset polyurethane layer. Polyurethane is a polymer composed of organic units joined by carbamate (urethane) links. The polyurethanes described herein are thermosetting polymers that do not melt when heated. Polyurethane polymers may be formed by reacting a di- or polyisocyanate with a polyol. Both the isocyanates and polyols used to make polyurethanes contain on average two or more functional groups per molecule. The polyurethanes described herein may have a functionality greater than 2.4 or 2.5.

A wide variety of polyols may be used to form the aliphatic cross-linked polyurethane layer. The term polyol includes hydroxyl-functional materials that generally include at least 2 terminal hydroxyl groups. Polyols include diols (materials with 2 terminal hydroxyl groups) and higher polyols such as triols (materials with 3 terminal hydroxyl groups), tetraols (materials with 4 terminal hydroxyl groups), and the like. Typically, the reaction mixture contains at least some diol and may also contain higher polyols. Higher polyols are particularly useful for forming cross linked polyurethane polymers. Diols may be generally described by the structure HO—B—OH, where the B group may be an aliphatic group, an aromatic group, or a group containing a combination of aromatic and aliphatic groups, and may contain a variety of linkages or functional groups, including additional terminal hydroxyl groups.

Polyester polyols are particularly useful. Among the useful polyester polyols useful are linear and non-linear polyester polyols including, for example, polyethylene adipate, polybutylene succinate, polyhexamethylene sebacate, polyhexamethylene dodecanedioate, polyneopentyl adipate, polypropylene adipate, polycyclohexanedimethyl adipate, and poly e-caprolactone. Particularly useful are aliphatic polyester polyols available from King Industries, Norwalk, Conn., under the trade name "K-FLEX' such as K-FLEX 188 or K-FLEX A308.

A wide variety of polyisocyanates may be used to form the aliphatic cross-linked polyurethane layer. The term polyisocyanate includes isocyanate-functional materials that generally include at least 2 terminal isocyanate groups. Polyisocyanates include diisocyanates (materials with 2 terminal isocyanate groups) and higher polyisocyanates such as triisocyanates (materials with 3 terminal isocyanate groups), tetraisocyanates (materials with 4 terminal isocyanate groups), and the like. Typically, the reaction mixture contains at least one higher isocyanate if a difunctional polyol is used. Higher isocyanates are particularly useful for forming crosslinked polyurethane polymers. Diisocyanates may be generally described by the structure OCN—Z—NCO, where the Z group may be an aliphatic group, an aromatic group, or a group containing a combination of aromatic and aliphatic groups.

Higher functional polyisocyanates, such as triisocyanates, are particularly useful. to form a crosslinked polyurethane polymer layer. Triisocyanates include, but are not limited to, polyfunctional isocyanates such as those produced from biurets, isocyanurates, adducts, and the like. Some commercially available polyisocyanates include portions of the DESMODUR and MONDUR series from Bayer Corporation, Pittsburgh, Pa., and the PAPI series from Dow Plastics, a business group of the Dow Chemical Company, Midland, Mich. Particularly useful triisocyanates include those available from Bayer Corporation under the trade designations DESMODUR N3300A and MONDUR 489. One particularly suitable aliphatic polyisocyanate is DESMODUR N3300A.

The reactive mixture used to form the transparent aliphatic cross-linked polyurethane layer also contains a catalyst. The catalyst facilitates the step-growth reaction between the polyol and the polyisocyanate. Conventional catalysts generally recognized for use in the polymerization of urethanes may be suitable for use with the present disclosure. For example, aluminum-based, bismuth-based, tin-based, vanadium-based, zinc-based, or zirconium-based catalysts may be used. Tin-based catalysts are particularly useful. Tin-based catalysts have been found to significantly reduce the amount of outgassing present in the polyurethane. Most desirable are dibutyltin compounds, such as dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide. In particular, the dibutyltin dilaurate catalyst DABCO T-12, commercially available from Air Products and Chemicals, Inc., Allentown, Pa. is particularly suitable. The catalyst is generally included at levels of at least 200 ppm or even 300 ppm or greater.

The polyurethane compositions described above can be utilized to make a film stack as shown in FIG. 1. Film stack 100 includes quarter-wave retarder 116, polyurethane layer 120 and a layer comprising PVOH 110. In some embodiments, quarter-wave retarder 116 has a thickness of 1 μm to 5 μm; polyurethane layer 120 has a thickness of 4 μm to 10 μm; and PVOH layer 110 has a thickness of less than 5 μm or less than 3 μm.

Figure 2A:

In some embodiments, film stack 100 is made and used, e.g., according to the following process. As shown in FIG. 2A, in step 1, PVOH layer 110 can be coated on an orienting layer 102 and oriented. Orienting layer 102 can be, e.g., a layer of strain hardening polyester. Polyesters have carboxylate and glycol subunits which are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. The properties of a polymer layer or film vary with the particular choice of monomer molecules. One example of a polyester is polyethylene naphthalate (PEN) which can be made, for example, by reactions of naphthalene dicarboxylic acid with ethylene glycol.

Suitable carboxylate monomer molecules for use in forming the carboxylate subunits of the polyester layers include, for example, 2,6-naphthalene dicarboxylic acid and isomers thereof; terephthalic acid; isophthalic acid; phthalic acid; azelaic acid; adipic acid; Sebacic acid; norbornene dicarboxylic acid; bi-cyclooctane dicarboxylic acid; 1,4-cyclohexane dicarboxylic acid and isomers thereof; t-butyl isophthalic acid, tri-mellitic acid, sodium sulfonated isophthalic acid; 2,2'-biphenyl dicarboxylic acid and isomers thereof, and lower alkyl esters of these acids, such as methyl or ethyl esters. The term "lower alkyl" refers, in this context, to C1-C10 straight-chained or branched alkyl groups. Also included within the term "polyester" are polycarbonates which are derived from the reaction of glycol monomer molecules with esters of carbonic acid.

Suitable glycol monomer molecules for use in forming glycol subunits of the polyester layers include ethylene glycol, propylene glycol, 1,4-butanediol and isomers thereof; 1,6-hexanediol, neopentylglycol, polyethylene glycol; diethylene glycol, tricyclodecane diol, 1,4-cyclohexanedimethanol and isomers thereof, norbornanediol, bicyclo-octanediol, trimethylol propane; pentaerythritol, 1,4-benzenedimethanol and isomers thereof; bisphenol A, 1,8-dihydroxy biphenyl and isomers thereof; and 1,3-bis(2-hydroxyethoxy)benzene.

Examples of useful strain hardening polyesters include polyethylene terephthalate, mixed diol substituted co-polyethylene terephthalates, polyethylene naphthalene-2,6-dicarboxylate, mixed diol substituted co-polyethylene naphthalene-2,6-dicarboxylate, polyethylene terephthalate-co-naphthalene-2,6-dicarboxylate, mixed diol substituted polyethylene terephthalate-co-naphthalene-2,6-dicarboxylate, polyethylene terephthalate-co-biphenyl-4,4'-dicarboxylate, mixed diol substituted copolyethylene terephthalate-co-biphenyl-4,4'-dicarboxylate, polyethylene naphthalene-2,6-dicarboxylate-co-biphenyl-4,4'-dicarboxylate, mixed diol substituted polyethylene naphthalene-2,6-dicarboxylate-co-biphenyl-4,4'-dicarboxylate, polyethylene terephthalate-co-naphthalene-2,6-dicarboxylate-co-biphenyl-4,4'-dicarboxylate, and mixed diol substituted polyethylene terephthalate-co-naphthalene-2,6-dicarboxylate-co-biphenyl-4,4'-dicarboxylate, e.g., Mixed diols can comprise of two carbon C2 up to C10 linear, branched or cyclic chain lengths. Isophthalates such as dimethyl sulfosodium isophthalate ionomer may also be substituted for terephthalate, 2,6-naphthalene dicarboxylate, and 4,4'-biphenyl dicarboxylates.

In some embodiments, orienting layer 102 is PEN or Low Melt PEN. PEN can be described as a 0.48 IV polyethylene 2,6-naphthalate polymer. Low Melt PEN can be described as a 0.48 IV copolyester comprised of 90 mol % naphthalate moieties and 10 mol % terephthalate moieties on an esters basis. Ethylene glycol comprises the diols in this polymer. The orienting layer serves as the carrier vehicle, support substrate, enabling flat film production during both the orientation and annealing process. Post-annealing, the orienting layer serves to provide high modulus and dimensional stability. In some embodiments, orienting layer 102 comprises multiple layers.

Preferably, orienting layer 102 has a Tg no less than 10° C. below the Tg of the PVOH layer. The Tg of PVOH layer may be suppressed based on the level of water present in the layer. The phrase "glass transition temperature" or "Tg" refers herein to the on-set glass transition temperature by DSC and is measured according to ASTM E1256-08 2014.

Orienting layer 102 can be coated with PVOH solution, dried and then stretched, e.g., using a standard tenter optionally with heat. Preferably, orienting layer 102 is stretched in the length direction prior to coating with PVOH so that orienting layer 102 is biaxially oriented, while the PVOH is stretched only uniaxially. Biaxially orienting orienting layer 102 provides beneficial mechanical properties so that the film stack is more robust and less likely to tear.

PVOH layer 110 can be any suitable thickness, preferably less than 5 μm thick after orientation. In some embodiments, the PVOH layer may be 0.5 μm, 0.8 μm or 1.2 μm to 1.5 μm, 2 μm or 3 μm thick after orientation. The PVOH layer may be coated or extruded over the multilayer film described above such that the multilayer film and the PVOH layer can be oriented together. The general process for producing PVOH films is described, e.g., in U.S. Pat. No. 6,096,375. The PVOH coating solution typically contains between 2 and 20% polymer in water based on weight, with the preferred concentration typically being between 5 and 15%. In some embodiments, the PVOH coating comprises water, PVOH and surfactant. KURARAY 2899 PVOH from KURARAY America (Houston, TX) is an example of a suitable PVOH. The PVOH should have a degree of hydrolysis of between 95 and 100%, preferably between 97 and 99.5%. The dry coating weight typically ranges from 2 to 80 grams per square meter. The PVOH-coated multilayer film can then be stretched at elevated temperatures to develop oriented PVOH layer 110 and multilayer film 100. This temperature is preferably above the glass transition temperature of at least one of the components of multilayer film 100. In general, the temperature is 60 to 160° C. In some embodiments, the temperature is 105 to 120° C. Following stretching, the film stack can be heat set, preferably at a temperature is 160 to 220° C.

The film is typically stretched from 2 to 10 times the original dimension. Preferably, the film will be stretched from 3 to 6 times the original dimension. The film may be allowed to dimensionally relax in the cross-stretch direction from the natural reduction in cross-stretch direction (equal to the square root of the stretch ratio) to being constrained (i.e., no substantial change in cross-stretch dimensions). The film may be stretched in the machine direction, as with a length orienter, or width using a tenter, or optionally both where the cast web is stretched in one direction before PVOH coating.

Figure 2B:

As shown in FIG. 2B, in step 2, oriented PVOH layer 110 is coated with polyurethane layer 120. For example, using standard coating methods such as using a slot coater. Typically, the polyurethane layer is solvent coated but, in some embodiments, it may be 100% solids coated. In some embodiments the PVOH layer is primed or corona treated to promote polyurethane layer adhesion.

Figure 2C:
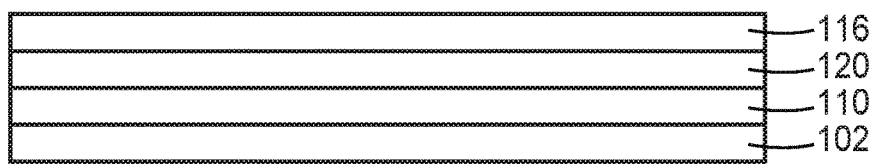

As shown in FIG. 2C, in step 3, quarter-wave retarder 116 is coated on polyurethane layer 120. Quarter-wave retarders can be provided, e.g., from oriented polymeric materials such as polycarbonate, polyethyl terephthalate or polyvinyl alcohol or from coated liquid crystal materials. Suitable materials include, e.g., linear photopolymerizable polymer (LPP) materials and the liquid crystal polymer (LCP) materials described in US Pat. App. Pub. Nos. US 2002/0180916 (Schadt et al.), US 2003/028048 (Cherkaoui et al.) and US 2005/0072959 (Moia et al.). Suitable LPP materials include ROP-131 EXP 306 LPP and suitable LCP materials include ROF-5185 EXP 410 LCP, both available from Rolic Technologies, Allschwil, Switzerland. In some examples, quarter wave retarders may be quarter wave retarders at at least one wavelength in the predetermined wavelength range. In FIG. 2C, quarter-wave retarder 116 is shown as one layer, but it can comprise multiple layers such as, e.g., an LPP layer an LCP half wave plate and an LCP quarter wave plate.

Figure 2D:
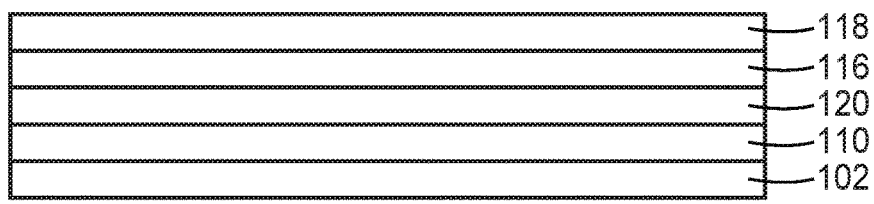

As shown in FIG. 2D, in optional step 4, premask 118 is added to quarter-wave retarder 116 to provide support in the staining step. Premask 118 typically comprises polyethylene terephthalate. In some embodiments, premask 118 is optically clear, e.g., for ease of defect measurement or transmission measurement to gauge level of stain without removing the premask. Premask 118 typically comprises a pressure sensitive (PSA) layer, preferably an optically clear PSA to adhere the premask. The PSA is selected to survive the staining step and be removable. In some embodiments, a thicker polyurethane layer (e.g., thicker than 25 μm) can be utilized to provide support in the staining step.

Next, as shown in FIG. 2E, in step 5, orienting layer 102 is removed to expose PVOH layer 110 for staining.

In step 6, shown in FIG. 2F, PVOH layer 110 is stained with an iodine solution to form an absorbing polarizer. The process includes an iodine staining and borating procedure. The stain bath is typically an aqueous solution of iodine. In some embodiments, the amount of iodine in 0.1 part by weight to 0.5 parts by weight with respect to 100 parts by weight water. In some embodiments, the aqueous solution of iodine is compounded with an iodide, e.g., in order to increase the solubility of iodine in water. Examples of useful iodides include potassium iodide, lithium iodide, sodium iodide, zinc iodide, aluminum iodide, lead iodide, copper iodide, barium iodide, calcium iodide, tin iodide, and titanium iodide. The composition can comprise, e.g., water (e.g., 80 wt %), potassium iodide (e.g., 19.7%) and iodine (e.g., 0.3%).

The boration bath composition is an aqueous solution of boric acid. The composition can be obtained by dissolving boric acid and/or a borate in water as a solvent. The concentration of boric acid is typically 1 part by weight to 10 parts by weight with respect to 100 parts by weight water. In some embodiments, the boration bath can comprise, e.g., water (e.g., 80 wt %), boric acid (e.g., 14%) and sodium borate (e.g., 6%).

The stain bath step is typically carried out, e.g., at a bath temperature of about 20 to 50° C. for about 5 seconds to 5 minutes. In some embodiments, the stain batch step is carried out at about 30° C. for about 30-40 seconds.

The boration step is typically carried out e.g., at a bath temperature of about 40 to 85° C. for about 15 seconds to 5 minutes. Ins some embodiments, the boration step is carried about at about 65° C. for about 40-50 seconds.

After boration, the film stack can be rinsed with water and dried, e.g., for 5 minutes in a 70° C. oven. The resulting film stacks are surprisingly crack-free and mechanically robust. They are ready for integration into a device such as a bendable or foldable display device for use as a circular polarizing film to reduce reflectivity.

EXAMPLES

Objects and advantages of this invention are further illustrated by the following examples, but the particular materials and amounts thereof recited in these examples, as well as other conditions and details, should not be construed to unduly limit this invention.

Materials Used in the Examples

| Abbreviation | Description and Source |
| --- | --- |
| PD | KFLEX 188, polyester diol, obtained by King Industries, Inc, Norwalk, CT |
| HMDI | DESMODUR N3300, isocyanate trimer based on hexamethylene diisocyanate, obtained by Bayer MaterialScience AG, Leverkusen, Germany |
| DTD | DABCO T12, dibutyl tin dilaurate, obtained by Air Products, Allentown, PA |
| LPP | ROP-131 EXP 306, linear photopolymerizable polymer, obtained by Rolic Technologies, Allschwil, Switzerland |
| LCP | ROF-5185 EXP 410, liquid crystal polymer, obtained by Rolic Technologies, Allschwil, Switzerland |
| PEGDA | M286, polyethylene glycol diacrylate, obtained by Rahn, Aurora, IL |
| MEK | Methyl ethyl ketone |
| PI | Esacure One, alpha-hydroxy ketone photoinitiator, obtained by IGM Resins Inc., Charlotte, NC |
| TICTA | SR368, tris (2-hydroxy ethyl) isocyanurate triacrylate, obtained by Sartomer Inc., Exton, PA |
| AO | CN146, acrylic oligomer, obtained by Sartomer Inc., Exton, PA |
| PAO | CN2304, polyester acrylate oligomer, obtained by Sartomer Inc. Exton PA |
| APETPU | U8001, aliphatic polyester-polyurethane dispersion, obtained by Alberdingk Boley Inc., Greensboro, NC |
| APCPU | U933, aliphatic polycarbonate polyurethane dispersion, obtained by Alberdingk Boley Inc., Greensboro, NC |

Examples 1-2

PD and HMDI at 120 and 100 parts by mass respectively were added to toluene at 10% solids in a plastic beaker at room temperature. This was agitated by hand with a stir rod until it was a homogenous mixture. Then DTD catalyst was added to this mixture at 150 ppm and the final mixture was agitated by hand with a stir rod until fully mixed. The amount of catalyst was based on the KFLEX 188 and Desmodur 3300.

The urethane mixture was coated via slot die to a moving web consisting of polyvinyl alcohol and a removable polyethylene terephthalate substrate, of speed 10 feet per minute at target thicknesses 7, 10 µm and thermally cured in ovens of 210 degrees Fahrenheit for approximately three minutes. The coating was applied directly onto the polyvinyl alcohol surface.

Examples 3-5

PD and HMDI at 110 and 100 parts by mass respectively were added to toluene at 10% solids in a plastic beaker at room temperature. This was agitated by hand until it was a homogenous mixture. Then DTD catalyst was added to this mixture at 150 ppm and the final mixture was agitated by hand with a stir rod until fully mixed. The amount of catalyst was based on the KFLEX 188 and Desmodur 3300.

The urethane mixture was coated via slot die to a moving web consisting of polyvinyl alcohol and a removable polyethylene terephthalate substrate, of speed 10 feet per minute at target thicknesses 4, 7, 10 µm and thermally cured in ovens of 210 degrees Fahrenheit for approximately three minutes. The coating was applied directly onto the polyvinyl alcohol surface.

Examples 6-8

PD and HMDI at 105 and 100 parts by mass respectively were added to toluene at 10% solids in a plastic beaker at room temperature. This was agitated by hand with a stir rod until it was a homogenous mixture. Then DTD catalyst was added to this mixture at 150 ppm and the final mixture was agitated by hand with a stir rod until fully mixed. The amount of catalyst was based on the KFLEX 188 and Desmodur 3300.

The urethane mixture was coated via slot die to a moving web consisting of polyvinyl alcohol and a removable polyethylene terephthalate substrate, of speed 10 feet per minute at target thicknesses 4, 7, 10 µm and thermally cured in ovens of 210 degrees Fahrenheit for approximately three minutes. The coating was applied directly onto the polyvinyl alcohol surface. The coating was applied directly onto the polyvinyl alcohol surface.

Examples 9-10

PD and HMDI at 80 and 100 parts by mass respectively were added to toluene at 10% solids in a plastic beaker at room temperature. This was agitated by hand with a stir rod until it was a homogenous mixture. Then DTD catalyst was added to this mixture at 150 ppm and the final mixture was agitated by hand with a stir rod until fully mixed. The amount of catalyst was based on the KFLEX 188 and Desmodur 3300.

The urethane mixture was coated via slot die to a moving web consisting of polyvinyl alcohol and a removable polyethylene terephthalate substrate of speed 10 feet per minute at target thicknesses 7, 10 µm and thermally cured in ovens of 210 degrees Fahrenheit for approximately three minutes. The coating was applied directly onto the polyvinyl alcohol surface.

TABLE 1

| Example | Isocyanate (Parts by Weight) | Polyol (Parts by Weight) | Thickness (μm) |
| --- | --- | --- | --- |
| 1 | 120 | 100 | 7 |
| 2 |  |  | 10 |
| 3 | 110 | 100 | 4 |
| 4 |  |  | 7 |
| 5 |  |  | 10 |
| 6 | 105 | 100 | 4 |
| 7 |  |  | 7 |
| 8 |  |  | 10 |
| 9 | 80 | 100 | 7 |
| 10 |  |  | 10 |

Comparative Examples 1-4

9 grams PEGDA and 0.9 grams PI was added to 290.1 grams MEK in a 500 mL amber glass jar at room temperature. The jar was capped and shaken until all components were uniformly mixed into solution.

The PEGDA mixture was coated via slot die to a moving web consisting of polyvinyl alcohol and a non-removable substrate such as those referenced in WO2019/003107, of speed 50 feet per minute at target thicknesses 100, 150, 200, 250 nm. The solvent was removed from the coating by heating in ovens of 190 degrees Fahrenheit for approximately two minutes prior to UV curing. The coating was applied directly onto the polyvinyl alcohol surface. The substrate surface was corona treated at 250 mJ/cm$^2$ prior to coating.

Comparative Examples 5-7

72.7 grams PEGDA and 7.3 grams PI was added to 120 grams MEK in a 500 mL amber glass jar at room temperature. The jar was capped and shaken until all components were uniformly mixed into solution.

The PEGDA mixture was coated via slot die to a moving web consisting of polyvinyl alcohol and a removable substrate, of speed 10 feet per minute at target thicknesses 4, 7, 10 μm. The solvent was removed from the coating by heating in ovens of 190 degrees Fahrenheit approximately two minutes prior to UV curing. The coating was applied directly onto the polyvinyl alcohol surface.

Comparative Examples 8-11

79.2 grams TICTA and 0.8 grams PI was added to 120 grams MEK in a 500 mL amber glass jar at room temperature. The jar was capped and shaken until all components were uniformly mixed into solution.

The TICTA mixture was coated via slot die to a moving web consisting of polyvinyl alcohol and a non-removable substrate such as those referenced in WO2019/003107, of speed 45 feet per minute at target thickness 210 nm. The solvent was removed from the coating by heating in ovens of 165-180 degrees Fahrenheit for approximately 40 seconds prior to UV curing. The coating was applied directly onto the polyvinyl alcohol surface. The substrate surface was corona treated at 0, 250, 500, 750 mJ/cm$^2$ prior to coating.

Comparative Examples 12-14

79.2 grams TICTA and 0.8 grams PI was added to 120 grams MEK in a 500 mL amber glass jar at room temperature. The jar was capped and shaken until all components were uniformly mixed into solution.

The TICTA mixture was coated via slot die to a moving web consisting of polyvinyl alcohol and a removable substrate, of speed 10 feet per minute at target thicknesses 4, 7, 10 μm. The solvent was removed from the coating by heating in ovens of 190 degrees Fahrenheit for approximately two minutes prior to UV curing. The coating was applied directly onto the polyvinyl alcohol surface.

Comparative Examples 15-18

79.2 grams AO and 0.8 grams PI was added to 120 grams MEK in a 500 mL amber glass jar at room temperature. The jar was capped and shaken until all components were uniformly mixed into solution.

The AO mixture was coated via slot die to a moving web consisting of polyvinyl alcohol and a non-removable substrate such as those referenced in WO2019/003107, of speed 45 feet per minute at target thickness 210 nm. The solvent was removed from the coating by heating in ovens of 165-180 degrees Fahrenheit for approximately 40 seconds prior to UV curing. The coating was applied directly onto the polyvinyl alcohol surface. The substrate surface was corona treated at 0, 250, 500, 750 mJ/cm$^2$ prior to coating.

Comparative Examples 19-21

79.2 grams AO and 0.8 grams PI was added to 120 grams MEK in a 500 mL amber glass jar at room temperature. The jar was capped and shaken until all components were uniformly mixed into solution.

The AO mixture was coated via slot die to a moving web consisting of polyvinyl alcohol and a removable substrate, of speed 10 feet per minute at target thicknesses 4, 7, 10 μm. The solvent was removed from the coating by heating in ovens of 190 degrees Fahrenheit for approximately two minutes prior to UV curing. The coating was applied directly onto the polyvinyl alcohol surface.

Comparative Examples 22-25

79.2 grams PAO and 0.8 grams PI was added to 120 grams MEK in a 500 mL amber glass jar at room temperature. The jar was capped and shaken until all components were uniformly mixed into solution.

The PAO mixture was coated via slot die to a moving web consisting of polyvinyl alcohol and a non-removable substrate such as those referenced in WO2019/003107, of speed 45 feet per minute at target thickness 210 nm. The solvent was removed from the coating by heating in ovens of 165-180 degrees Fahrenheit for approximately 40 seconds prior to UV curing. The coating was applied directly onto the polyvinyl alcohol surface. The substrate surface was corona treated at 0, 250, 500, 750 mJ/cm$^2$ prior to coating.

Comparative Examples 26-28

79.2 grams PAO and 0.8 grams PI was added to 120 grams MEK in a 500 mL amber glass jar at room temperature. The jar was capped and shaken until all components were uniformly mixed into solution.

The PAO mixture was coated via slot die to a moving web consisting of polyvinyl alcohol and a removable substrate, of speed 10 feet per minute at target thicknesses 4, 7, 10 μm. The solvent was removed from the coating by heating in ovens of 190 degrees Fahrenheit for approximately two minutes prior to UV curing. The coating was applied directly onto the polyvinyl alcohol surface.

Comparative Example 29

75 parts by mass APETPU, supplied at 40% solids in water, was added to 925 parts by mass water and mixed until homogenous. The mixture was then coated onto a moving cast polyester web by hand via syringe and metered with a #18 Mayer rod. The cast web was subsequently stretched in the transverse direction and dried in tentering ovens until the web was six times its starting width. The final coating thickness was less than 500 nm.

Comparative Example 30

125 parts by mass APETPU, supplied at 40% solids in water, was added to 875 parts by mass water and mixed until homogenous. The mixture was then coated onto a moving cast polyester web by hand via syringe and metered with a #18 Mayer rod. The cast web was subsequently stretched in the transverse direction and dried in tentering ovens until the web was six times its starting width. The final coating thickness was less than 500 nm.

Comparative Example 31

175 parts by mass APETPU, supplied at 40% solids in water, was added to 825 parts by mass water and mixed until homogenous. The mixture was then coated onto a moving cast polyester web by hand via syringe and metered with a #18 Mayer rod. The cast web was subsequently stretched in the transverse direction and dried in tentering ovens until the web was six times its starting width. The final coating thickness was less than 500 nm.

Comparative Example 32

86 parts by mass APCPU, supplied at 35% solids in water, was added to 914 parts by mass water and mixed until homogenous. The mixture was then coated onto a moving cast polyester web by hand via syringe and metered with a #18 Mayer rod. The cast web was subsequently stretched in the transverse direction and dried in tentering ovens until the web was six times its starting width. The final coating thickness was less than 500 nm.

Comparative Example 33

143 parts by mass APCPU, supplied at 35% solids in water, was added to 857 parts by mass water and mixed until homogenous. The mixture was then coated onto a moving cast polyester web by hand via syringe and metered with a #18 Mayer rod. The cast web was subsequently stretched in the transverse direction and dried in tentering ovens until the web was six times its starting width. The final coating thickness was less than 500 nm.

Comparative Example 34

200 parts by mass APCPU, supplied at 35% solids in water, was added to 800 parts by mass water and mixed until homogenous. The mixture was then coated onto a moving cast polyester web by hand via syringe and metered with a #18 Mayer rod. The cast web was subsequently stretched in the transverse direction and dried in tentering ovens until the web was six times its starting width. The final coating thickness was less than 500 nm.

Subsequent Step to Examples 1-10 and Comparative Examples 1-4, 8-11, 15-18, 22-25, 29-37

Next a quarter wave plate was made. Materials were solvent coated, and UV cured onto the urethane coating with the slow optical axis oriented at 45 degrees relative to the pass direction of the integrated polarizer. The coated layer had a retardation of 138 nm at a wavelength of 550 nm. (Retardation is defined by Re=(ni−nj)*d, where ni−nj is the in-plane birefringence difference between the slow and fast optical axis of the coated material and d is the thickness of the coated layer.) The coating materials utilized were materials similar to those described in US2002/0180916, US2003/028048 and US2005/0072959 where the linear photopolymerizable polymer (LPP) material was ROP-131 EXP 306 LPP and the liquid crystal polymer (LCP) material was ROF-5185 EXP 410 LCP (both available from Rolic Technologies, Allschwil, Switzerland).

Measurement of Adhesion Test Method 1

The sample consisting of substrate, PVOH, primer, and QWP was taped with double-sided tape (3M 415, 3M Company, St. Paul, MN) to a glass panel above a linear polarizer and back light. The QWP was oriented side-up toward the air. Next the sample was carefully scored using a 11-tooth blade (Gardco PA-2053, Paul N. Gardner Company, Pompano Beach, FL or the like) with tooth spacing 1 mm apart. Then the sample was carefully scored again perpendicular to the first set of score marks to create a 10×10 square grid. 1-inch tape (3M 8403) was pressed onto the scored grid at a 45-degree angle to the score marks, in a manner that it completely covered the scored grid. The 1-inch tape was applied for 30 seconds before removal. The grid was observed visually through a linear polarizer and Percent Retained was recorded.

TABLE 2

| TM1 Adhesion Classifications | |
|---|---|
| Classification | % Retained |
| Bad | 0-59 |
| Poor | 60-79 |
| OK | 80-89 |
| Good | 90-99 |
| Excellent | 100 |

Measurement of Adhesion Test Method 2

The adhesion was measured using a modified version of a Test Method 1. This method was developed for the cases in which the primer coatings were applied to a removable substrate. With the substrate being removable, the adhesion between the substrate and the primer coating was not sufficient for tape removal, so the substrate needed to be removed first. Furthermore, the blades used in Adhesion Test Method 1 tore through the coating stack without a substrate to support it. Thus, very sharp razor blades were necessary to score the cross-hatch grid. The test method is as follows:

First, two-inch double-sided tape with a paper liner (3M 415, 3M Company, St. Paul, MN) was applied to the quarter wave plate side of the coated film in the machine direction. Next, the removable substrate was removed from the coated film stack, leaving the polyvinyl alcohol, the urethane coating, and the quarter wave plate adhered to the double-sided tape with paper liner. The paper liner was then removed from the double-sided tape and the tape/film stack was laminated to a glass plate with a rubber roller. The glass plate was located above a backlight with a linear polarizer (Sanritz HLC2-5618, Sanritz Corporation, Tokyo, JP) located in between the glass plate and backlight panel. Aqueous iodine solution was applied to the exposed surface of the film stack via cotton tipped applicator. If the film stack stained with iodine, that indicated that all the layers had successfully transferred. If the film stack had not stained, that indicated that some or all of the layers did not transfer. Five straight parallel lines located 2 mm apart and 2.5 inches long were scored into the film stack with a razor blade guided by a stencil apparatus. Five more parallel lines that were equal in dimension and oriented perpendicular to the first five lines were scored such that a 5×5 square grid was created. 1-inch tape (3M 8403, 3M Company, St. Paul, MN) was pressed onto the scored grid at a 45-degree angle to the score marks, in a manner that it completely covered the scored grid. The 1-inch tape was adhered to the grid for 30 seconds before removal. Post removal, the grid was observed visually through a linear polarizer attached to a magnifying glass oriented ~15-degrees from the block-state to illuminate the quarter wave plate and show any areas of missing polyvinyl alcohol. Percent Retained within the grid area was then recorded. If the complete film stack did not transfer, that indicated a failure in adhesion and was noted as well. Alternatively, the grid could be stained with iodine solution, observed visually without linear polarizer, and Percent Retained within grid area recorded.

TABLE 3

TM2 Adhesion Classifications

| Classification | % Retained |
| --- | --- |
| NT | No Transfer |
| Bad | 0-59 |
| Poor | 60-79 |
| OK | 80-89 |
| Good | 90-99 |
| Excellent | 100 |

Cracking Test Method

Cracking was evaluated on a Pass/Fail basis after the coating stack including PVOH, primer, and QWP with a carrier substrate was subjected to an iodine staining bath, boration bath, rinsing, and drying in accordance with the processes described above. If there was any cracking whatsoever, it was deemed a Fail whereas if there was no cracking on the sample it was deemed Pass.

Iodine Uptake Test Method

The primer was coated onto a substrate without PVOH and submerged into an iodine staining bath, boration bath, rinsing, and drying in accordance with the processes described above. Next the primer layer was visually evaluated for yellow color and given a Fail grade if any color was observed. If no color was found it was deemed Pass.

TABLE 4

| Example | Primer | Thickness (μm) | Corona (mJ/cm2) | Adhesion TM | Adhesion | Cracking | Iodine Uptake |
| --- | --- | --- | --- | --- | --- | --- | --- |
| Example 1 | U1.2 | 7 | 0 | 2 | Good | Pass | Pass |
| Example 2 | U1.2 | 10 | 0 | 2 | Good | Pass | Pass |
| Example 3 | U1.1 | 4 | 0 | 2 | Good | Pass | Pass |
| Example 4 | U1.1 | 7 | 0 | 2 | OK | Pass | Pass |
| Example 5 | U1.1 | 10 | 0 | 2 | Good | Pass | Pass |
| Example 6 | U1.05 | 4 | 0 | 2 | Good | Pass | Pass |
| Example 7 | U1.05 | 7 | 0 | 2 | Excellent | Pass | Pass |
| Example 8 | U1.05 | 10 | 0 | 2 | Excellent | Pass | Pass |
| Example 9 | U0.8 | 7 | 0 | 2 | OK | Pass | Pass |
| Example 10 | U0.8 | 10 | 0 | 2 | OK | Pass | Pass |
| Comp. Ex. 1 | PEGDA | 0.1 | 250 | 1 | Bad | ND | ND |
| Comp. Ex. 2 | PEGDA | 0.15 | 250 | 1 | Bad | ND | ND |
| Comp. Ex. 3 | PEGDA | 0.2 | 250 | 1 | Poor | ND | ND |
| Comp. Ex. 4 | PEGDA | 0.23 | 250 | 1 | OK | ND | ND |
| Comp. Ex. 5 | PEGDA | 4 | 0 | | ND | Pass | Fail |
| Comp. Ex. 6 | PEGDA | 7 | 0 | | ND | Fail | Fail |
| Comp. Ex. 7 | PEGDA | 10 | 0 | | ND | Fail | Fail |
| Comp. Ex. 8 | TICTA | 0.21 | 0 | 1 | Bad | ND | ND |
| Comp. Ex. 9 | TICTA | 0.21 | 250 | 1 | Good | ND | ND |
| Comp. Ex. 10 | TICTA | 0.21 | 500 | 1 | Good | ND | ND |
| Comp. Ex. 11 | TICTA | 0.21 | 750 | 1 | Good | ND | ND |
| Comp. Ex. 12 | TICTA | 4 | 0 | | ND | Fail | ND |
| Comp. Ex. 13 | TICTA | 7 | 0 | | ND | Fail | ND |
| Comp. Ex. 14 | TICTA | 10 | 0 | | ND | Fail | ND |
| Comp. Ex. 15 | AO | 0.21 | 0 | 1 | Bad | ND | ND |
| Comp. Ex. 16 | AO | 0.21 | 250 | 1 | Bad | ND | ND |
| Comp. Ex. 17 | AO | 0.21 | 500 | 1 | Bad | ND | ND |
| Comp. Ex. 18 | AO | 0.21 | 750 | 1 | Bad | ND | ND |
| Comp. Ex. 19 | AO | 4 | 0 | | ND | Fail | ND |
| Comp. Ex. 20 | AO | 7 | 0 | | ND | Fail | ND |
| Comp. Ex. 21 | AO | 10 | 0 | | ND | Fail | ND |
| Comp. Ex. 22 | PAO | 0.21 | 0 | 1 | Bad | ND | ND |
| Comp. Ex. 23 | PAO | 0.21 | 250 | 1 | Bad | ND | ND |
| Comp. Ex. 24 | PAO | 0.21 | 500 | 1 | Bad | ND | ND |
| Comp. Ex. 25 | PAO | 0.21 | 750 | 1 | Bad | ND | ND |
| Comp. Ex. 26 | PAO | 4 | 0 | | ND | Fail | ND |
| Comp. Ex. 27 | PAO | 7 | 0 | | ND | Fail | ND |
| Comp. Ex. 28 | PAO | 10 | 0 | | ND | Fail | ND |
| Comp. Ex. 29 | APETPU | <0.5* | 0 | 2 | NT | ND | ND |
| Comp. Ex. 30 | APETPU | <0.5* | 0 | 2 | NT | ND | ND |

TABLE 4-continued

| Example | Primer | Thickness (μm) | Corona (mJ/cm2) | Adhesion TM | Adhesion | Cracking | Iodine Uptake |
|---|---|---|---|---|---|---|---|
| Comp. Ex. 31 | APETPU | <0.5* | 0 | 2 | NT | ND | ND |
| Comp. Ex. 32 | APCPU | <0.5* | 0 | 2 | NT | ND | ND |
| Comp. Ex. 33 | APCPU | <0.5* | 0 | 2 | NT | ND | ND |
| Comp. Ex. 34 | APCPU | <0.5* | 0 | 2 | NT | ND | ND |

*Not measured, but likely less than 0.5 μm
**ND = No Data

The complete disclosures of the publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A film stack comprising:
   (a) a quarter-wave retarder comprising a layer of linear photopolymerized polymer or liquid crystal polymer,
   (b) a transparent aliphatic cross-linked polyurethane layer having a glass transition temperature in a range from 11 to 27° C. and a Tan Delta peak value in a range from 0.5 to 2.5, and
   (c) an oriented layer comprising polyvinyl alcohol, the polyurethane layer disposed between, and directly bonding together, the quarter-wave retarder and the layer comprising polyvinyl alcohol, the layer of linear photopolymerized polymer or liquid crystal polymer being disposed directly on the polyurethane layer.

2. The film stack of claim 1 further comprising a premask disposed on the quarter-wave retarder opposite the layer comprising polyvinyl alcohol.

3. The film stack of claim 2 wherein the premask comprises polyethylene terephthalate.

4. The film stack of claim 1 wherein the layer comprising polyvinyl alcohol is disposed on a film comprising a layer of strain hardening polyester.

5. The film stack of claim 1 wherein the quarter-wave retarder has a thickness of 1 μm to 5 μm.

6. The film stack of claim 1 wherein the polyurethane layer has a thickness of 4 μm to 10 μm.

7. The film stack of claim 1 wherein the layer comprising polyvinyl alcohol has a thickness of less than 5 μm.

8. The film stack of claim 7 wherein the layer comprising polyvinyl alcohol has a thickness of less than 3 μm.

9. The film stack of claim 1 wherein the film stack has a total thickness of less than 35 μm.

10. The film stack of claim 9 wherein the film stack has a total thickness of less than 20 μm.

11. The film stack of claim 10 wherein the film stack has a total thickness of less than 15 μm.

12. The film stack of claim 1 wherein the quarter-wave retarder comprises an oriented polymeric material or a coated liquid crystal material.

13. The film stack of claim 1 wherein the layer comprising polyvinyl alcohol is stained with a composition comprising iodine.

14. The film stack of claim 13 further comprising a second transparent aliphatic cross-linked polyurethane layer having a thickness of 2 to 5 μm disposed on the iodine stained layer comprising polyvinyl alcohol, the second transparent aliphatic cross-linked polyurethane layer having a glass transition temperature in a range from 11 to 27° C. and a Tan Delta peak value in a range from 0.5 to 2.5.

15. The film stack of claim 1 wherein the polyurethane layer does not stain with iodine.

16. A method of making a film stack comprising:
   (a) coating a layer comprising polyvinyl alcohol on a film comprising a layer of strain hardening polyester,
   (b) orienting the coated film in a first direction,
   (c) coating the layer comprising polyvinyl alcohol with a transparent aliphatic cross-linked polyurethane layer having a thickness of 100 μm or less, the transparent aliphatic cross-linked polyurethane layer having a glass transition temperature in a range from 11 to 27° C. and a Tan Delta peak value in a range from 0.5 to 2.5, and
   (d) coating the polyurethane layer with a quarter-wave retarder comprising a layer of linear photopolymerizable polymer or liquid crystal polymer, such that the polyurethane layer directly bonds together the quarter-wave retarder and the layer comprising polyvinyl alcohol, the layer of linear photopolymerizable polymer or liquid crystal polymer being disposed directly on the polyurethane layer.

* * * * *